US012145825B2

(12) United States Patent
Mack

(10) Patent No.: US 12,145,825 B2
(45) Date of Patent: Nov. 19, 2024

(54) WINCH MOUNT ASSEMBLY

(71) Applicant: Stacey W. Mack, Hanover, PA (US)

(72) Inventor: Stacey W. Mack, Hanover, PA (US)

(*) Notice: Subject to any disclaimer, the term of this patent is extended or adjusted under 35 U.S.C. 154(b) by 54 days.

(21) Appl. No.: 18/125,988

(22) Filed: Mar. 24, 2023

(65) Prior Publication Data

US 2024/0317550 A1 Sep. 26, 2024

(51) Int. Cl.
*B66D 1/28* (2006.01)

(52) U.S. Cl.
CPC ........ *B66D 1/28* (2013.01); *B66D 2700/0183* (2013.01)

(58) Field of Classification Search
CPC .......................... B66D 1/28; B66D 2700/0183
See application file for complete search history.

(56) References Cited

U.S. PATENT DOCUMENTS 5,871,188 A * 2/1999 Lyle ........................ B66D 1/28 248/223.41
D441,165 S * 4/2001 Savitski ........................ D34/33
7,344,120 B2 * 3/2008 McFarland .............. B66D 1/00 254/323
D682,750 S * 5/2013 Smith .......................... D12/162
D709,803 S * 7/2014 Lancaster .................... D12/162
10,603,966 B2 * 3/2020 Stojkovic ............... B60D 1/185
10,906,787 B2 * 2/2021 Grayson .................. B66D 1/46
2013/0181023 A1 * 7/2013 Shawanda ................ B66D 1/00 224/403
2014/0224853 A1 * 8/2014 Griese ..................... B60R 11/00 224/547
2018/0222262 A1 * 8/2018 Vetkos ..................... B60D 1/52
2022/0194288 A1 * 6/2022 Allicock ................. B60P 1/435

* cited by examiner

*Primary Examiner* — Monica E Millner
(74) *Attorney, Agent, or Firm* — Barley Snyder

(57) ABSTRACT

A winch mount assembly comprises a mount assembly. The mount assembly having an upper mount assembly. The upper mount assembly having a coupling plate. he coupling plate has a first portion positioned perpendicular to the top plate. The winch mount assembly further comprising a lower mount assembly. The lower mount assembly having a lower coupling plate. A cross member receiver formed by a first portion of the coupling plate, a security plate and a first portion of the lower coupling plate. The winch mount assembly further comprises a winch.

20 Claims, 14 Drawing Sheets

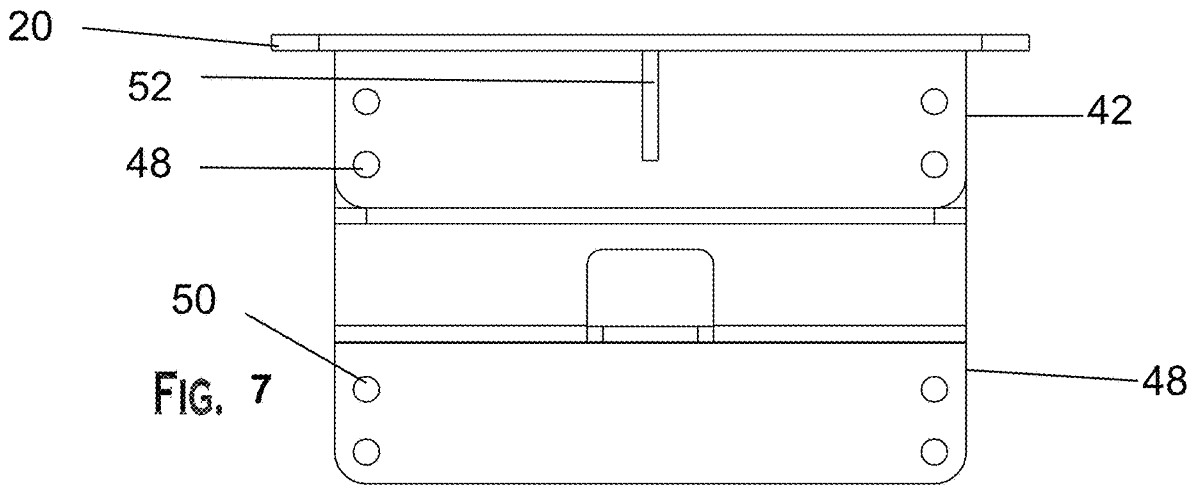
FIG. 7
FIG. 8
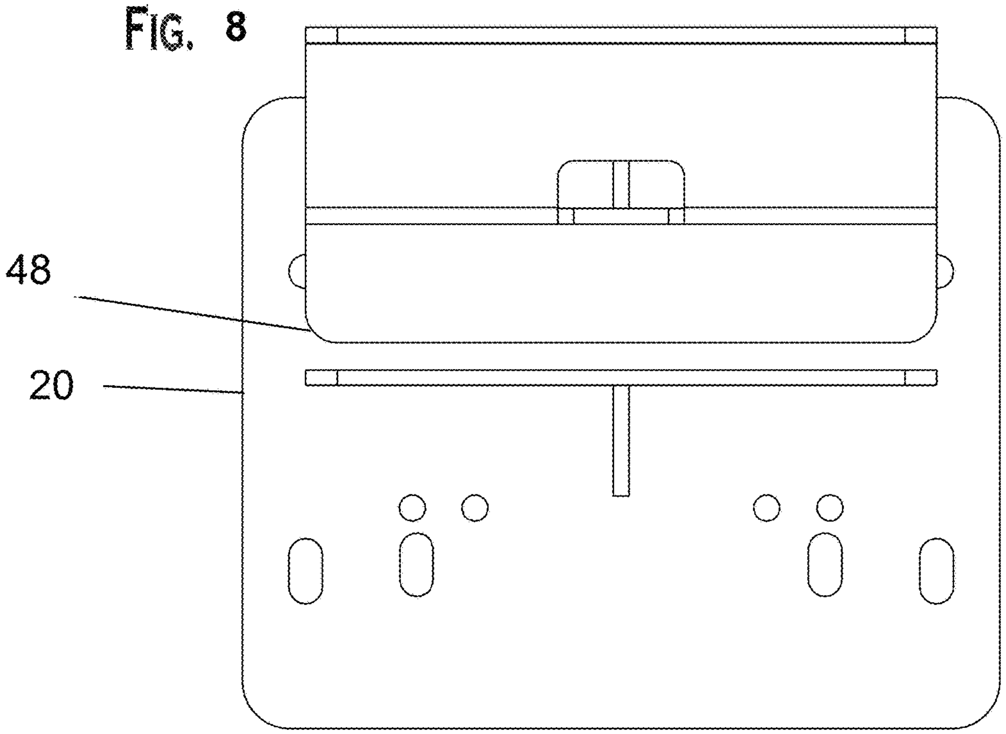

WINCH MOUNT ASSEMBLY

FIELD OF THE INVENTION

The present invention relates to a winch mount assembly and, more particularly, to an adjustable winch mount assembly to permit compatibility with a plurality of different dimensionally sized crossmembers of a standard lift.

BACKGROUND

In general, prior winch mount assemblies for automobile lifts were often in a fixed position and unable to be relocated around the lift or transported from one lift to the next. The previous embodiments were not able to be swapped between varying sized crossmembers.

It is desirable to design a winch mount assembly that has the versatility to be positioned at different portions of the lift and at different dimensionally sized cross members.

As the foregoing illustrates, the invention provides the winch mount assembly to portably position a winch on a plurality of different sized crossmember and lifts.

SUMMARY

A winch mount assembly comprises a mount assembly. The mount assembly having an upper mount assembly. The upper mount assembly having a top plate. The upper mount assembly further having a support plate positioned perpendicular to the top plate. The upper mount assembly further having a security plate positioned perpendicular to the top plate. The upper mount assembly further having a coupling plate. The coupling plate has a first portion positioned perpendicular to the top plate. The coupling plate further has a second portion, the first portion of the coupling has a greater surface area than the second portion of the coupling plate. The winch mount assembly further comprising a lower mount assembly. The lower mount assembly having a lower coupling plate with a first portion having a pair of clamp receivers corresponding to the support plate. The coupling plate further has a second portion having a pair of securing receivers corresponding to the second portion of the coupling plate. A cross member receiver is formed by the first portion of the coupling plate, the security plate and the first portion of the lower coupling plate. The winch mount assembly further comprises a winch.

BRIEF DESCRIPTION OF DRAWINGS

In the following, the present invention is described in more detail with references to the drawings in which:

FIG. 7 is left side view of FIG. 6;
FIG. 8 is a top view of FIG. 7.

DETAILED DESCRIPTION OF THE EMBODIMENT(S)

Figure 1:
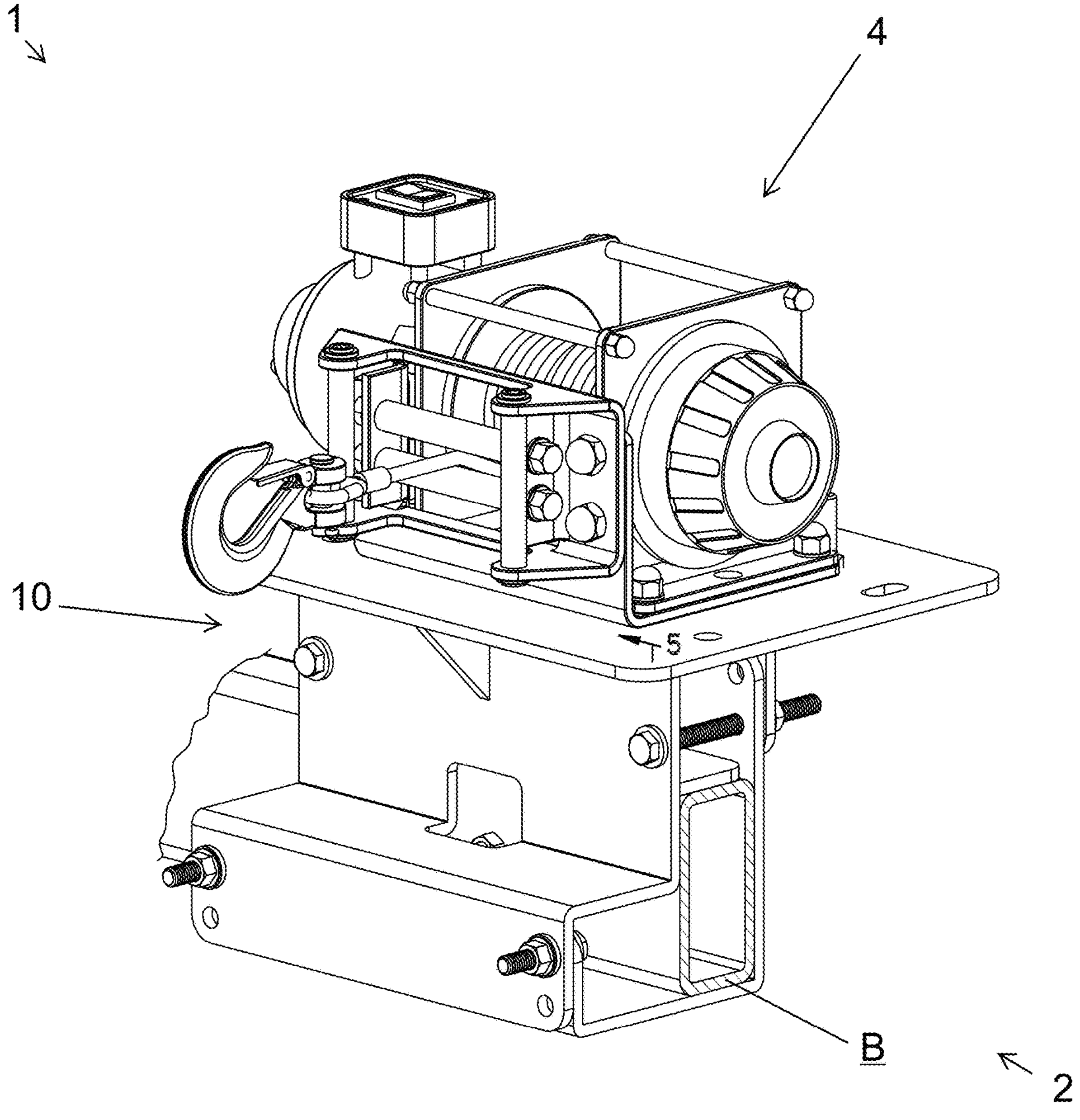
FIG. 1 is the winch mount assembly, as assembled.
Figure 2:
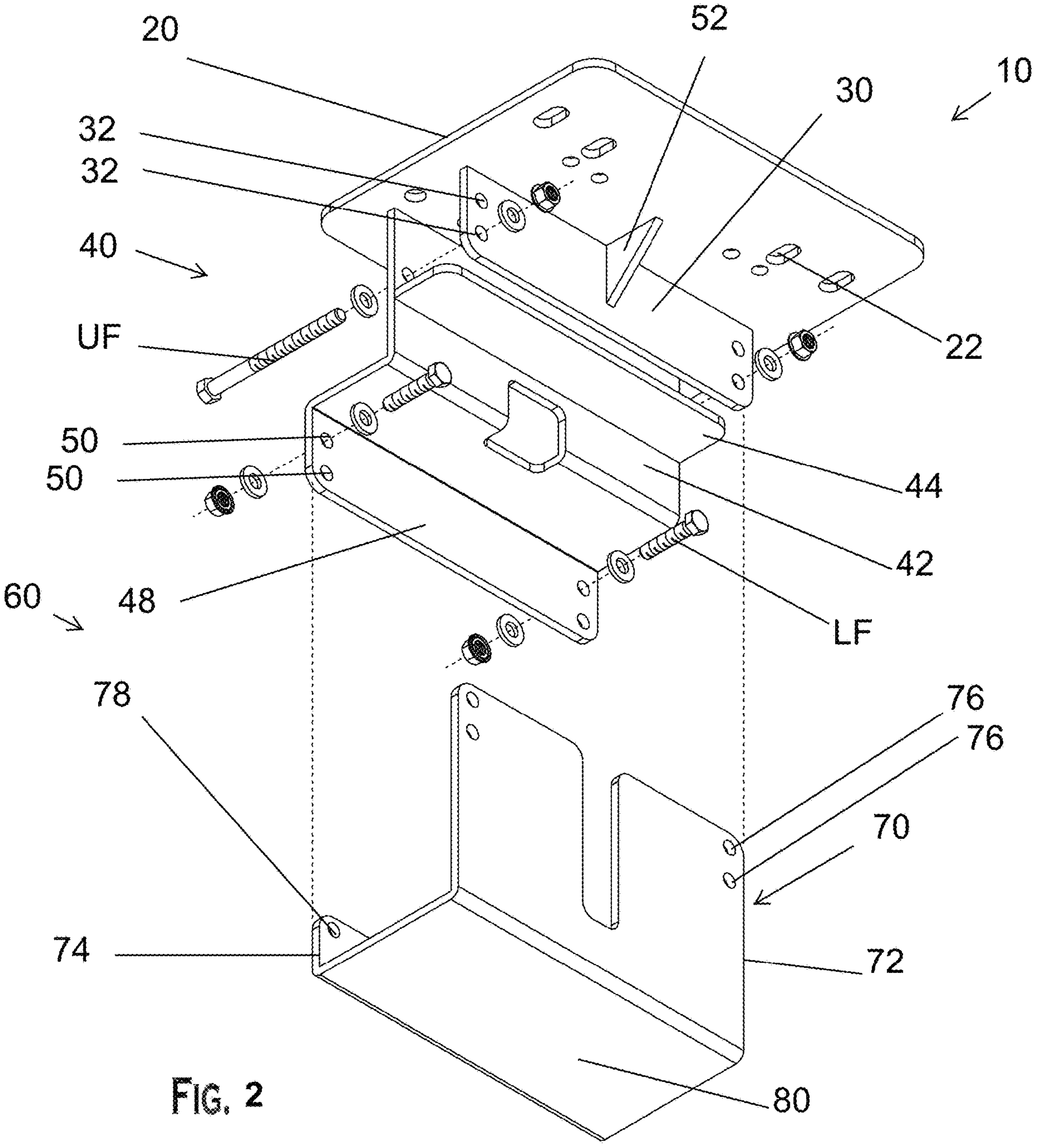
FIG. 2 is an exploded view of FIG. 1.
Figure 3:
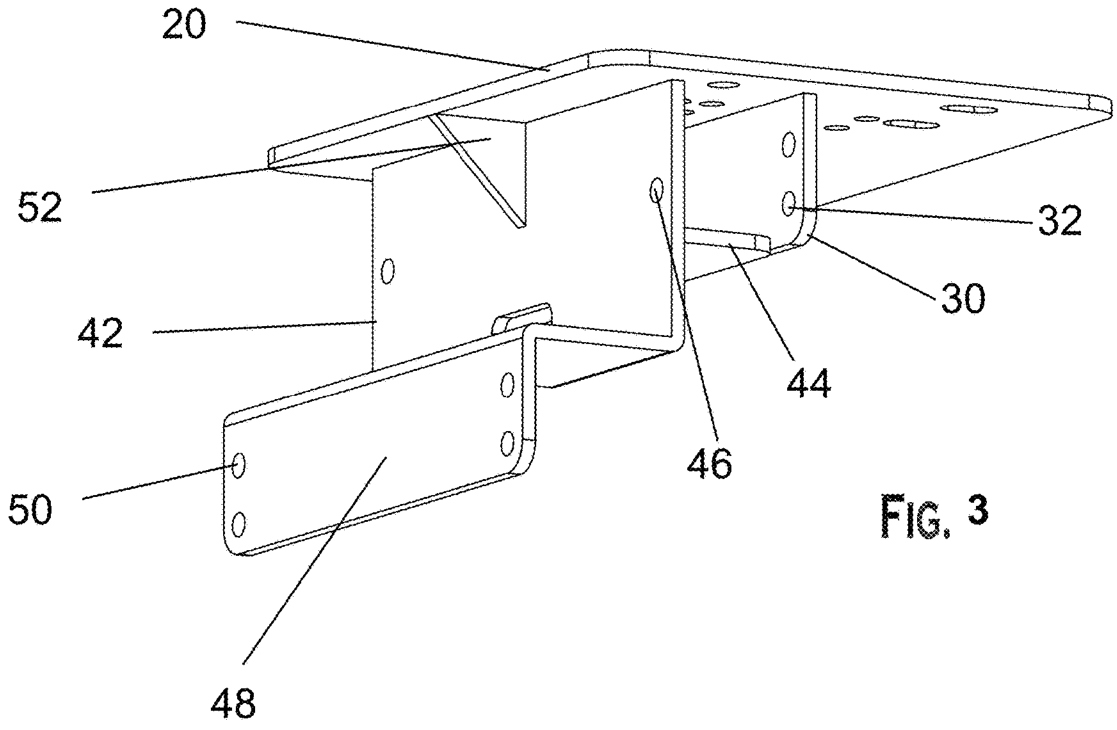
FIG. 3 is a front, bottom, right view of FIG. 2.
Figure 4:
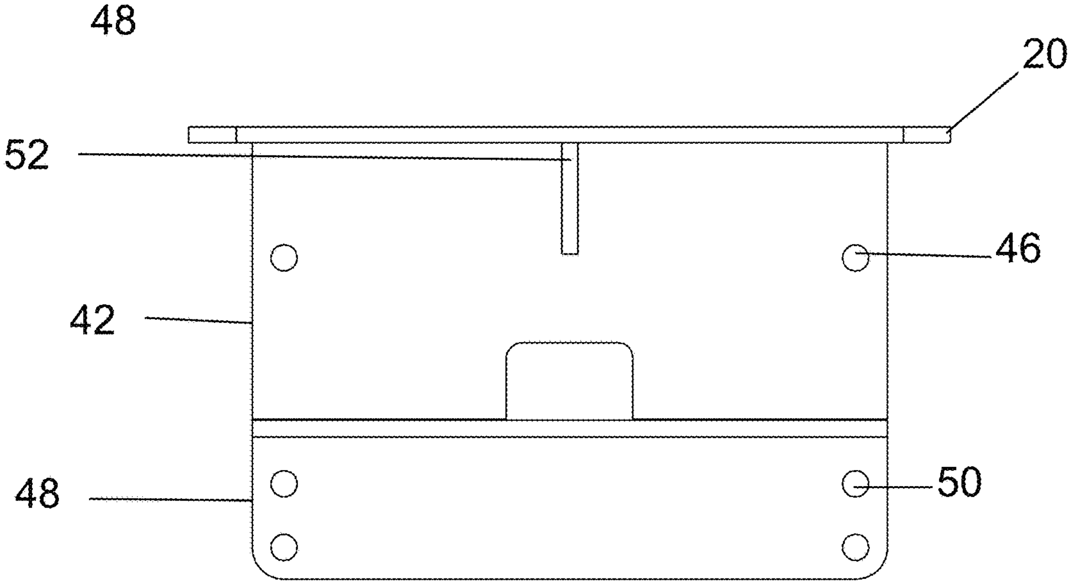
FIG. 4 is a right side view of FIG. 3.
Figure 5:
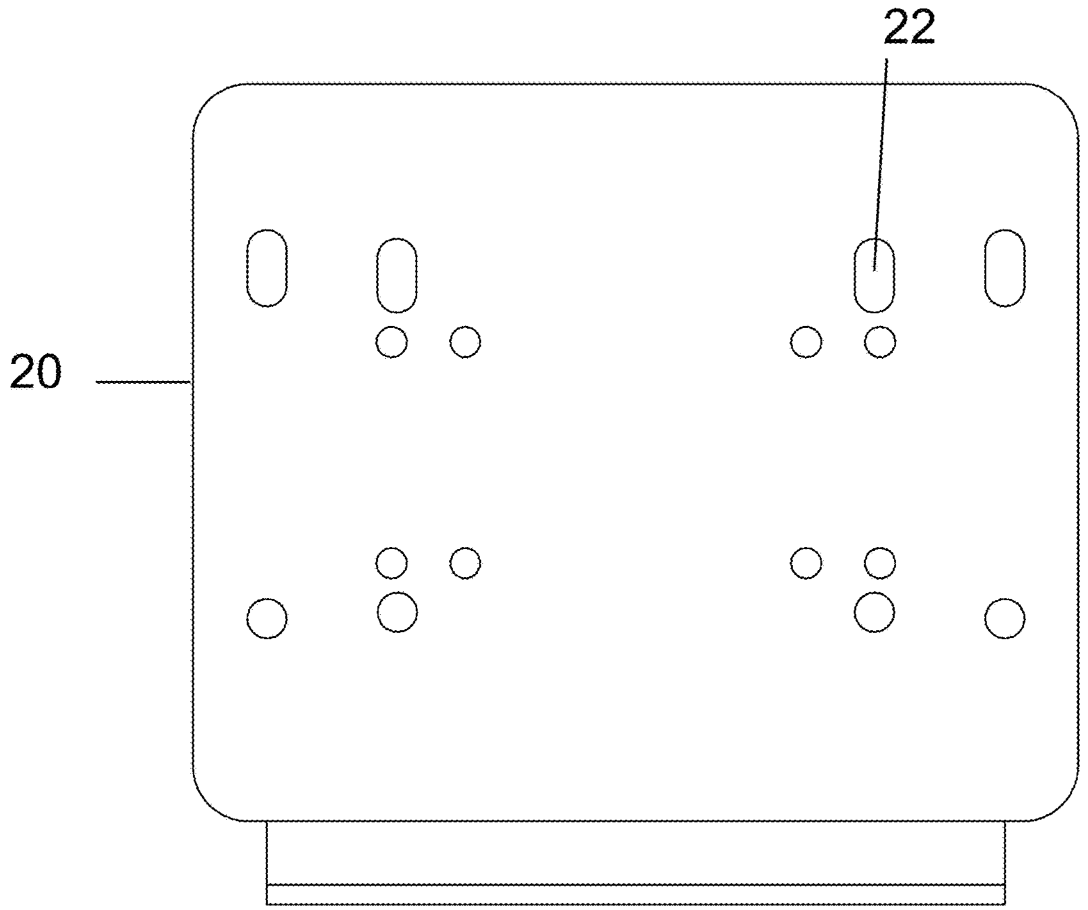
FIG. 5 is top view of FIG. 4.
Figure 6:
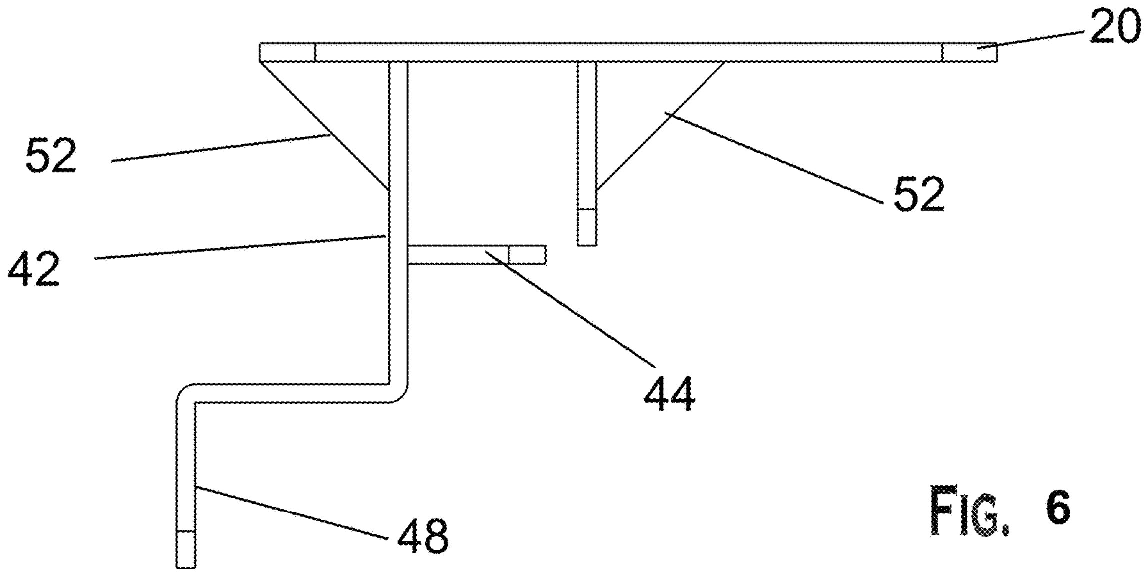
FIG. 6 is a front view of FIG. 5.
Figure 9:
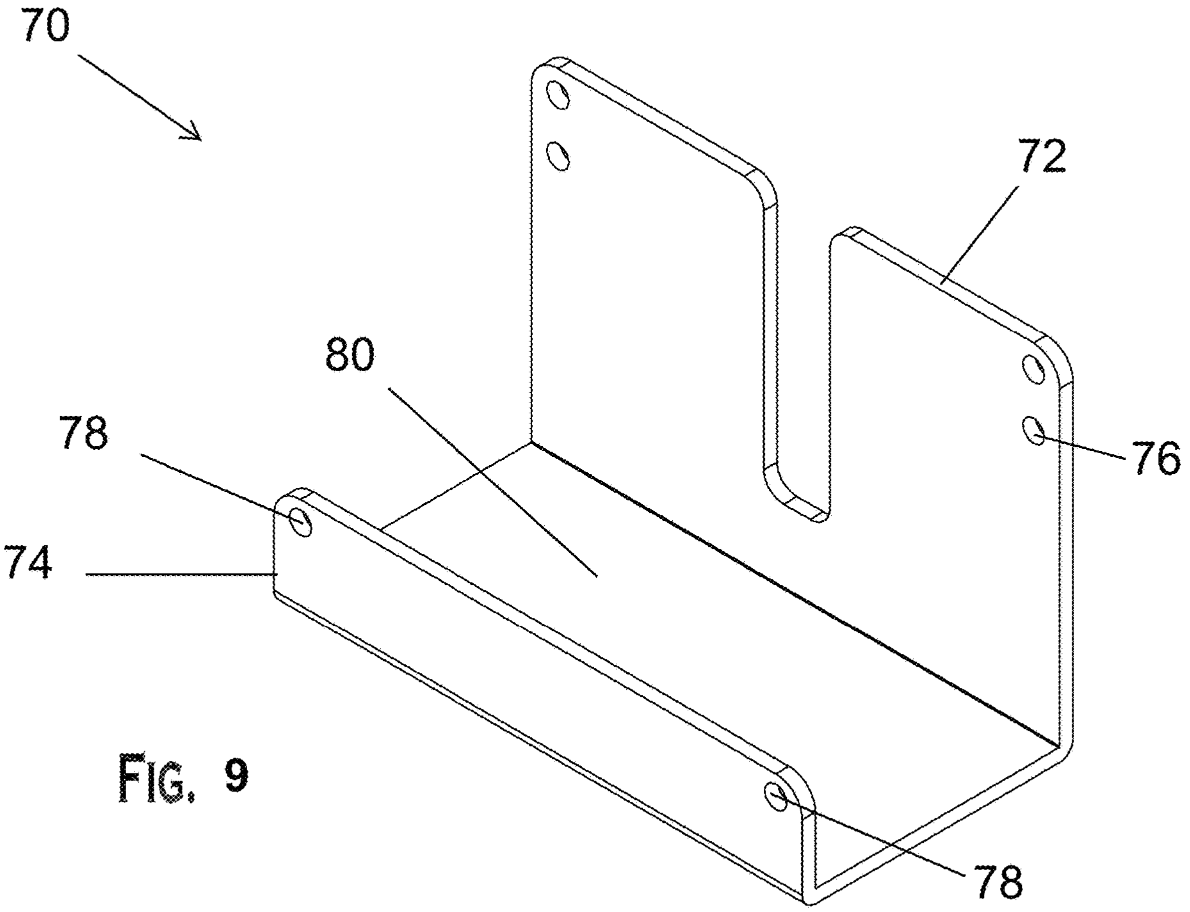
FIG. 9 is a top, front, right view of FIG. 8.
Figure 10:
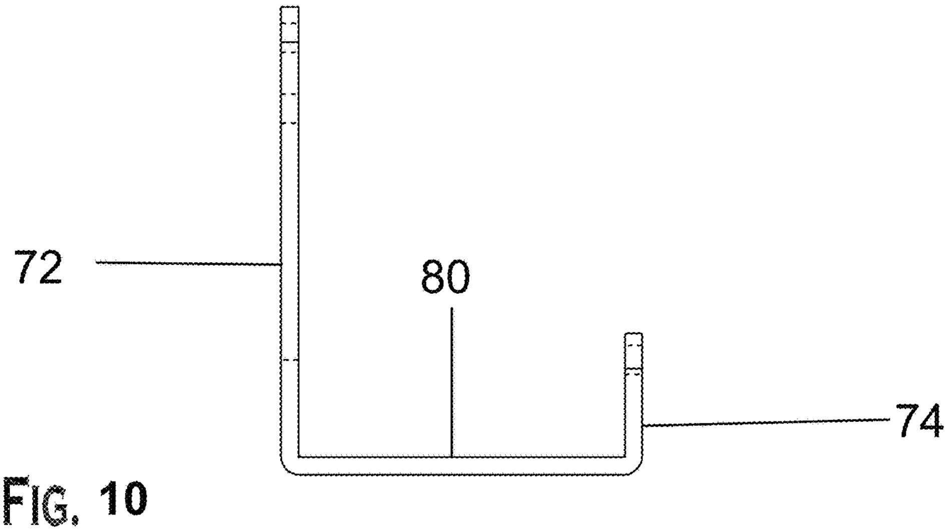
FIG. 10 is a rear view of FIG. 9.
Figure 11:
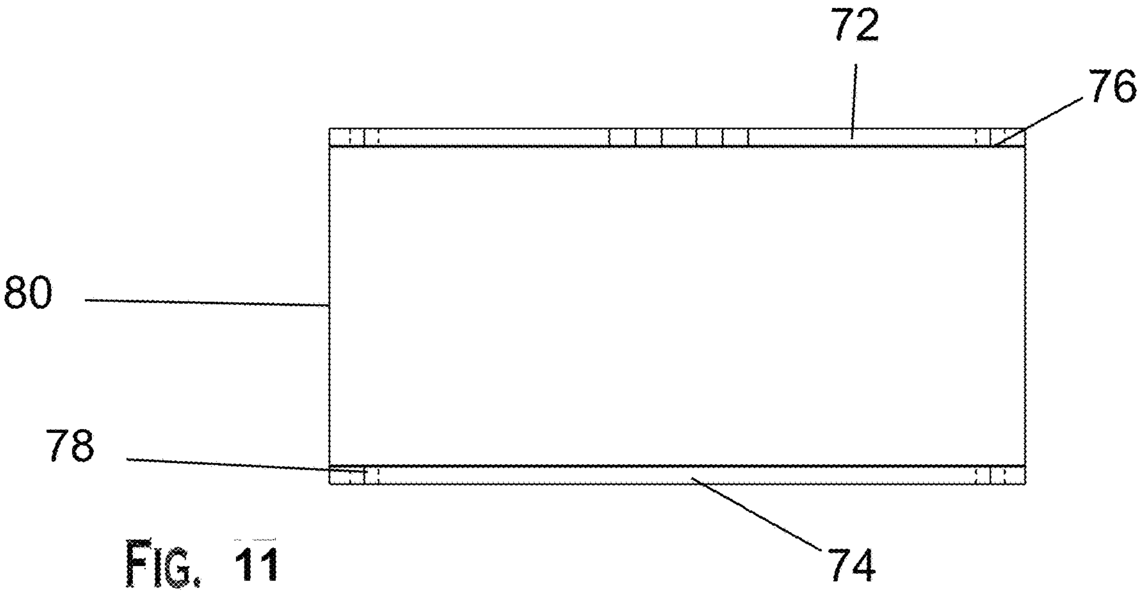
FIG. 11 is a top view of FIG. 10.
Figure 12:
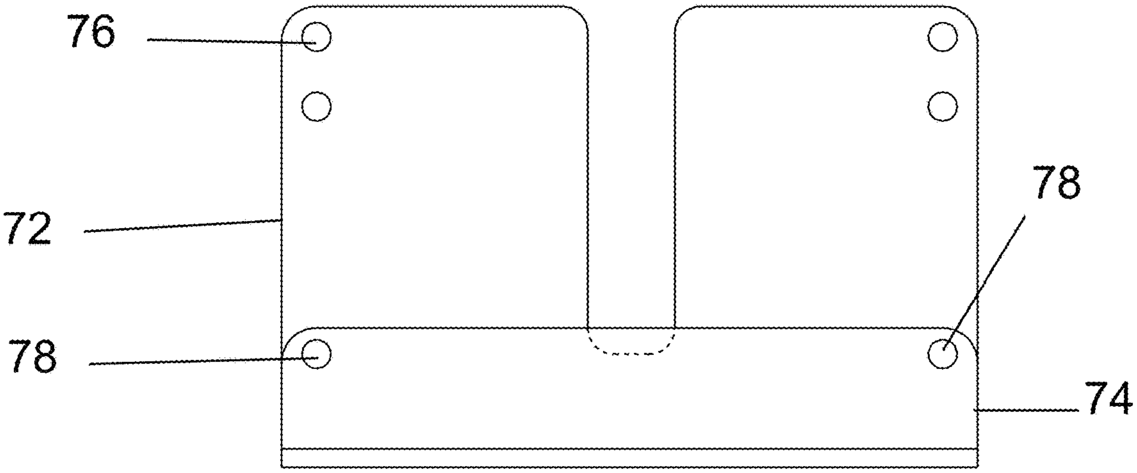
FIG. 12 is a right side view of FIG. 11.
Figure 13:
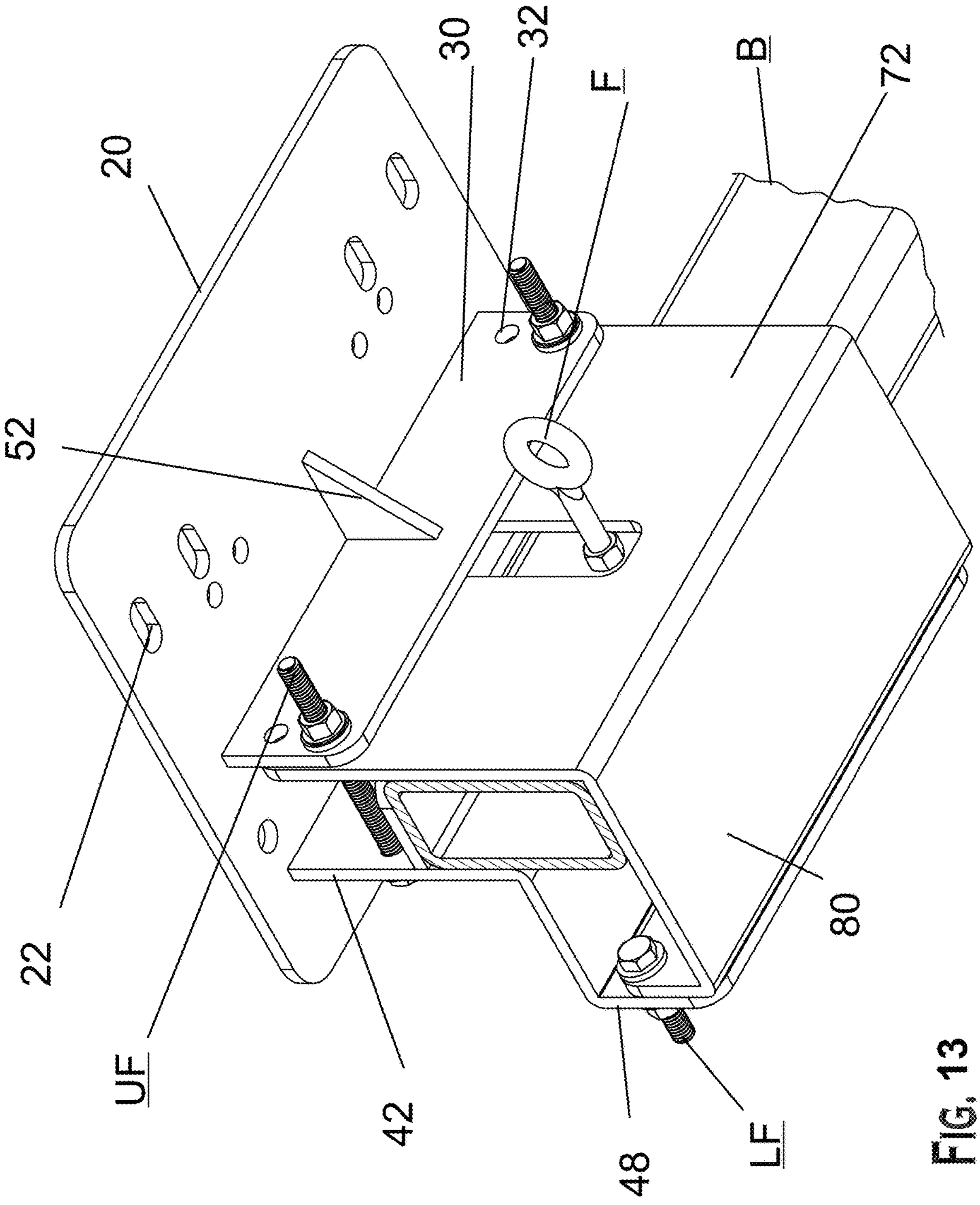
FIG. 13 is a front, bottom, left view of FIG. 12.
Figure 14:
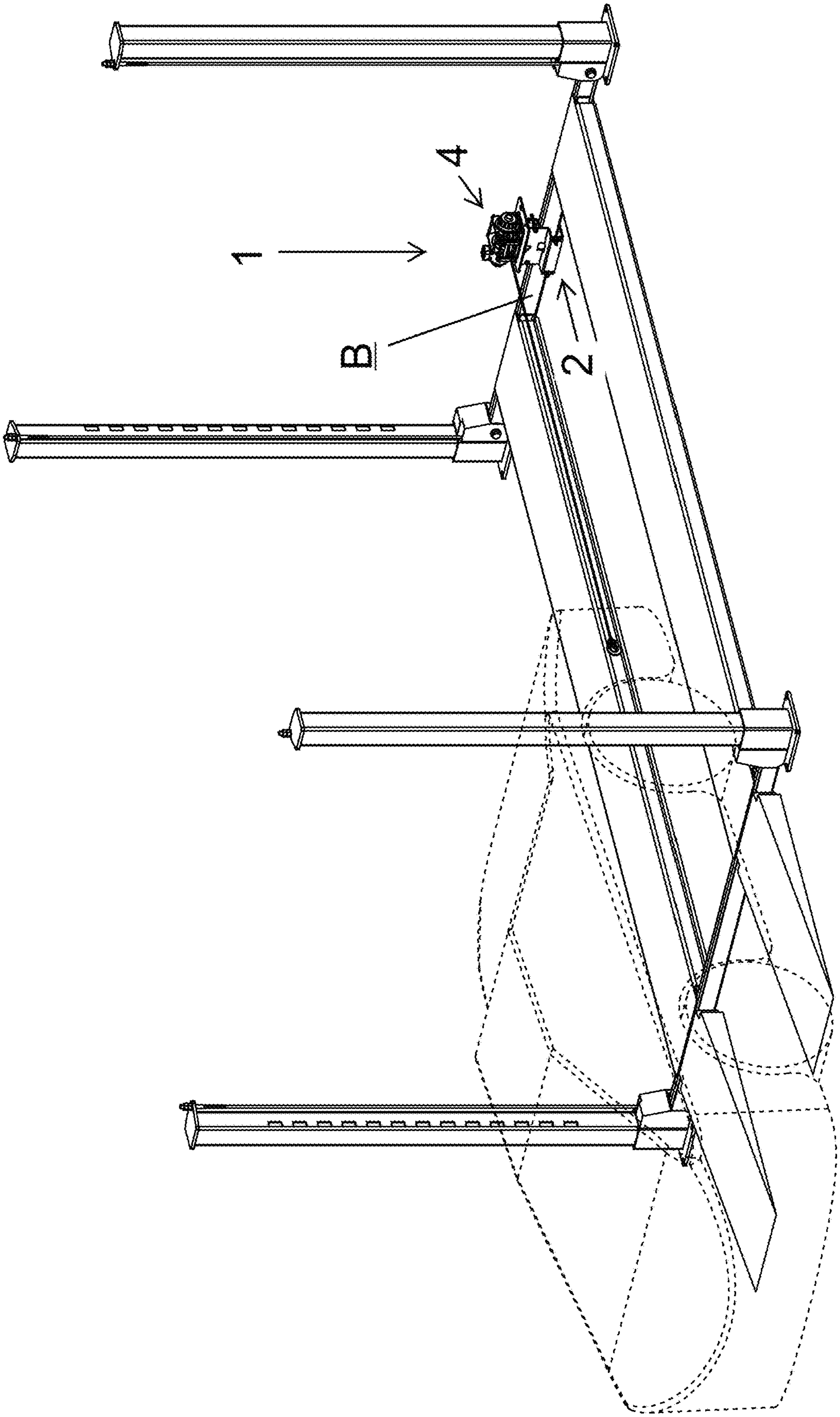
FIG. 14 is a perspective view of FIG. 13.
Figure 15:
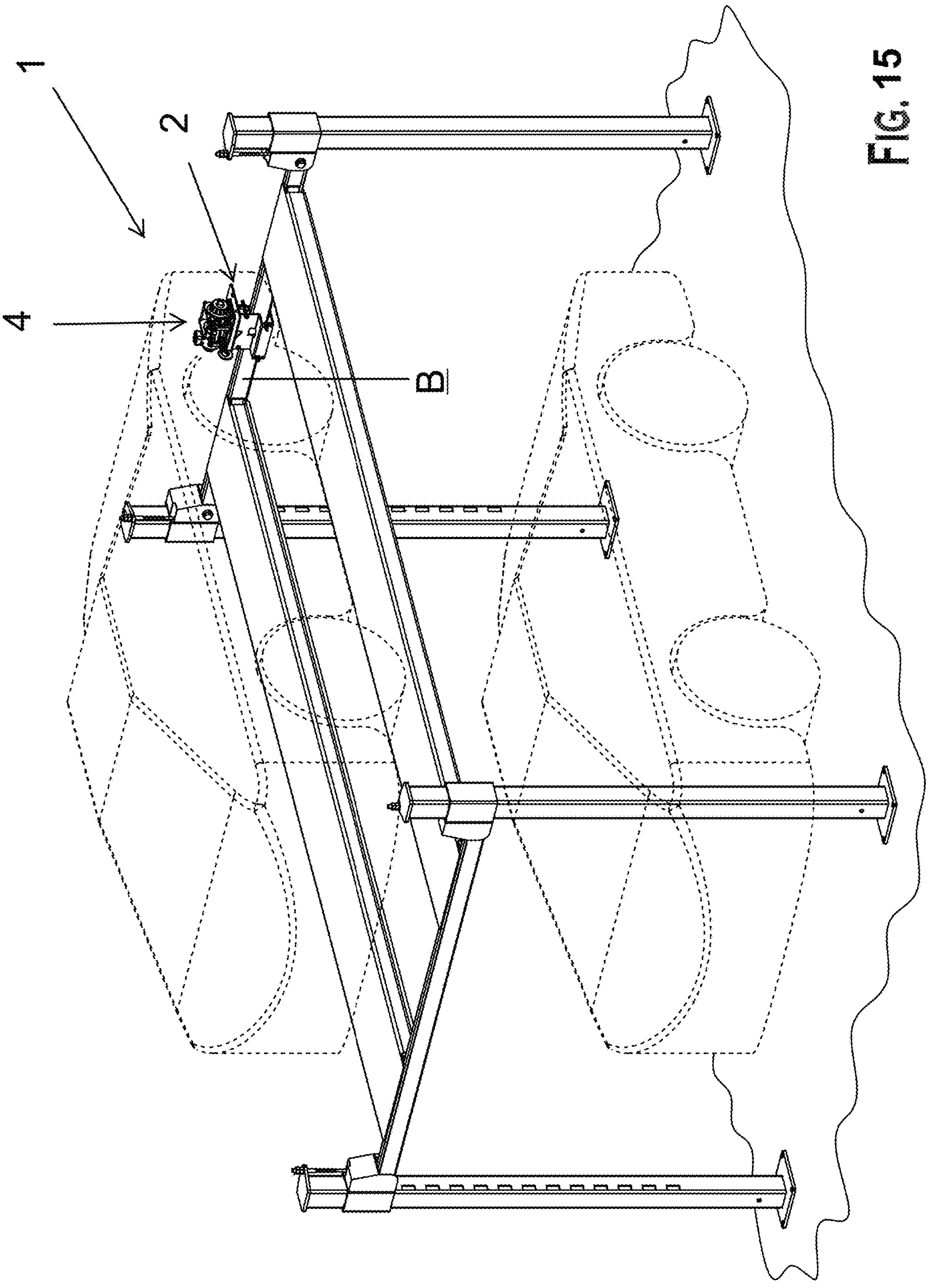
FIG. 15 is another perspective view of FIG. 14.
Figure 16:
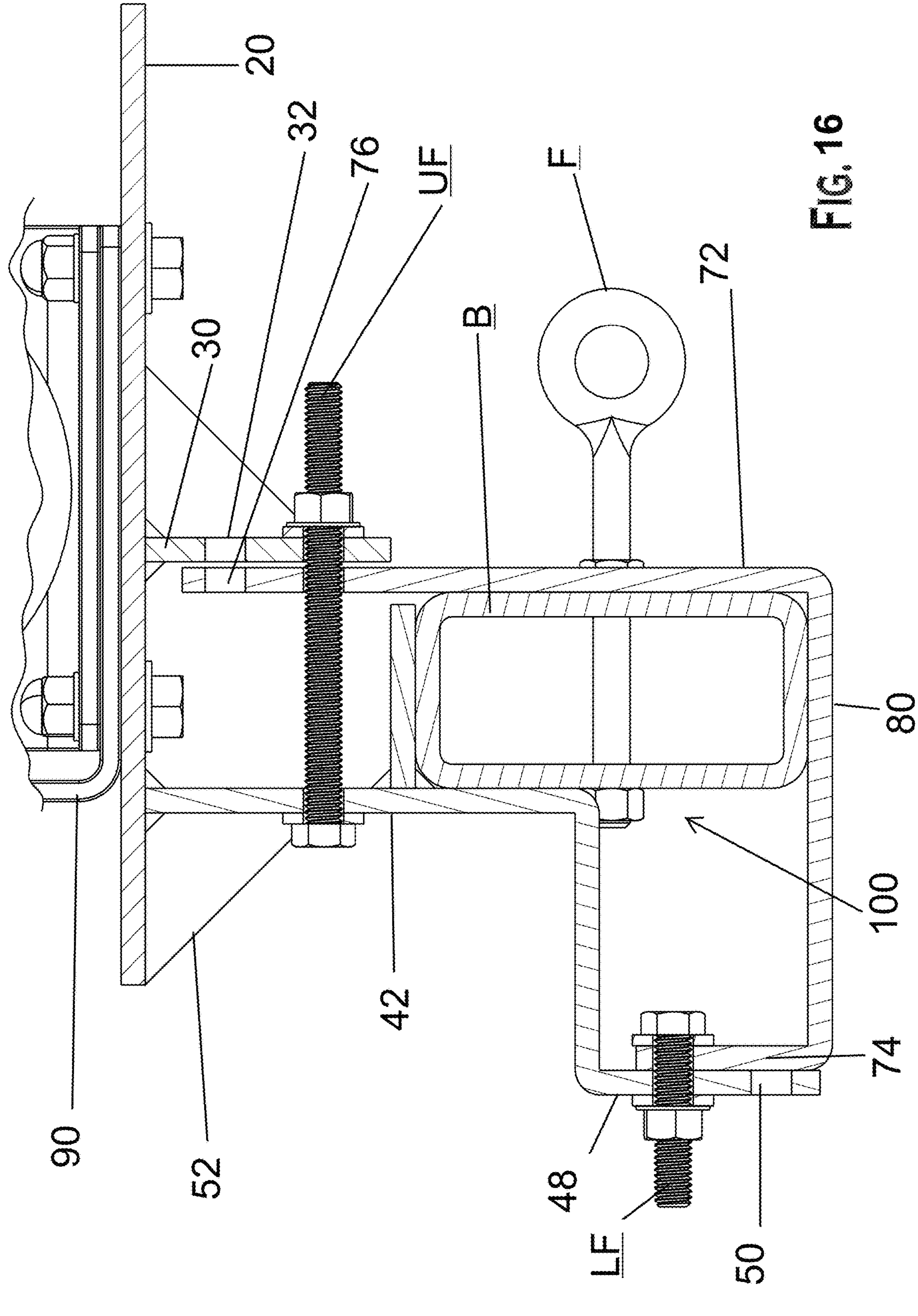
FIG. 16 is a cross section view of FIG. 15.
Figure 17:
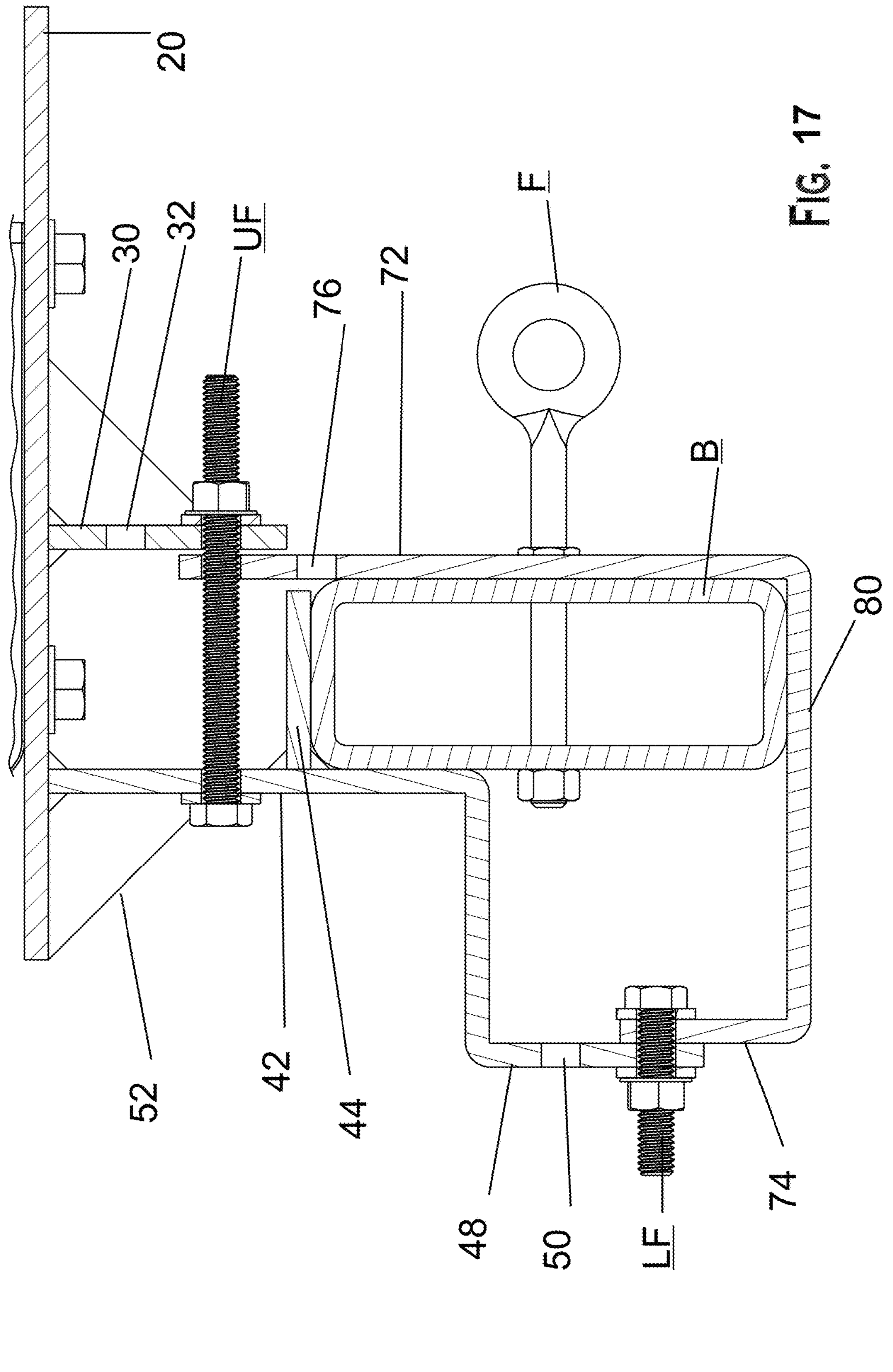
FIG. 17 is another cross section view of FIG. 16.
Figure 18:
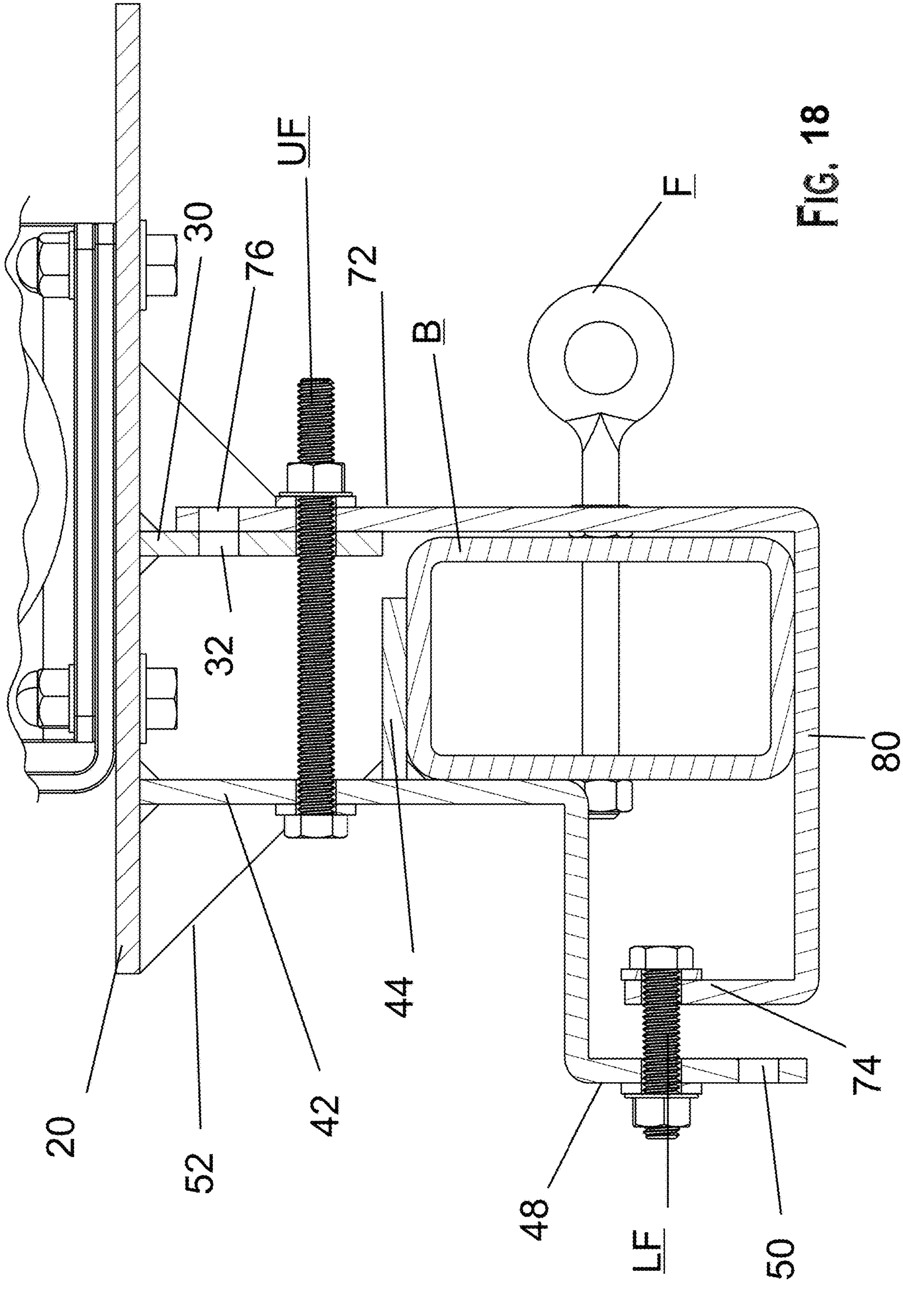
FIG. 18 is another cross section view of FIG. 17.
Figure 19:
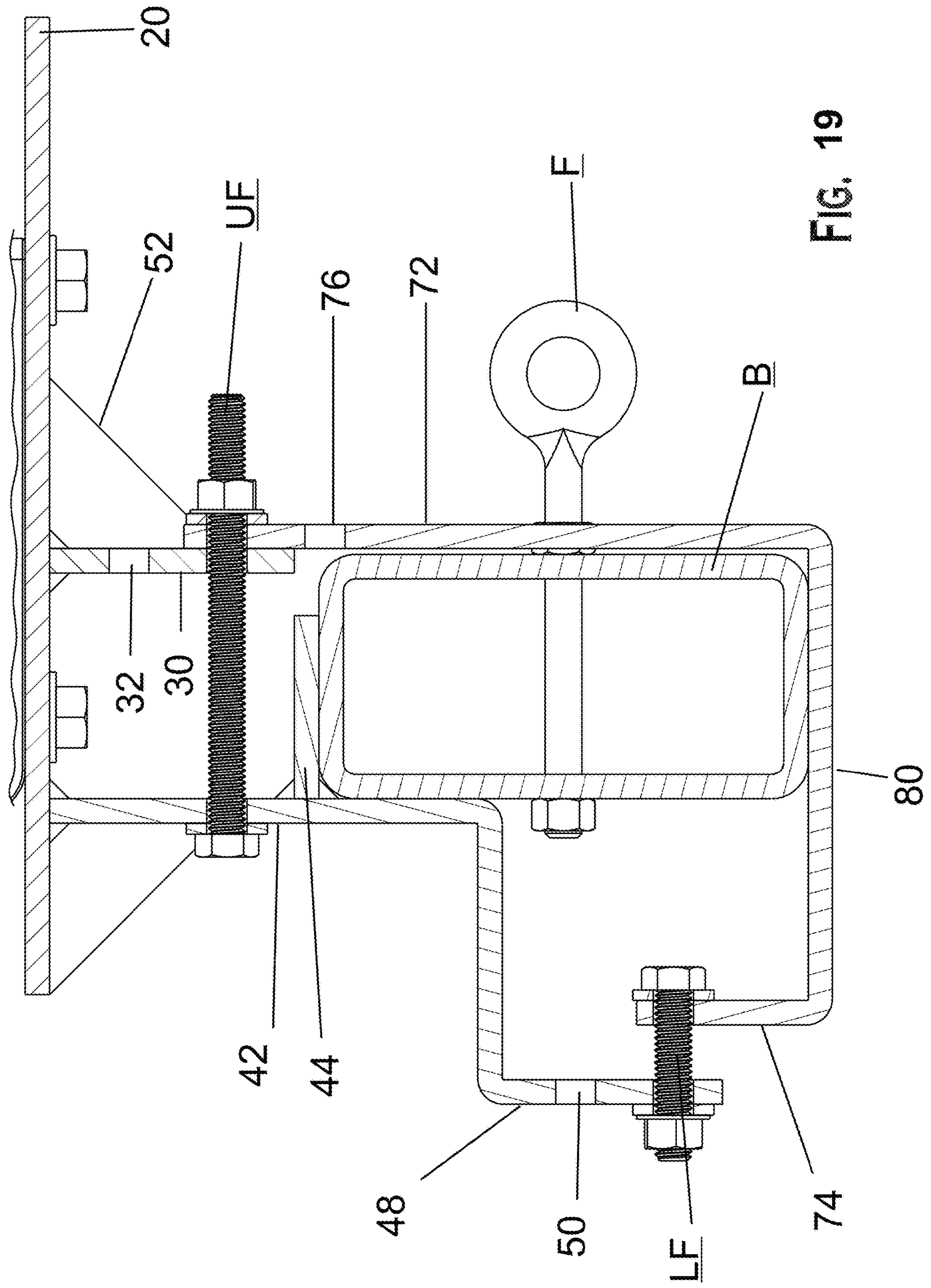
FIG. 19 is another cross section view of FIG. 18.

The present disclosure includes a winch mount assembly 1 according to the invention. In the exemplary embodiment, the winch mount assembly 1 generally has a mount assembly 2 and a winch assembly 4.

In the exemplary embodiment, the mount assembly 2 includes an upper mount assembly 10 and a lower mount assembly 60.

As illustrated, the upper mount assembly 10 includes a top plate 20, a support plate 30, a coupling plate 40 and a pair of support gussets 52.

As illustrated, the top plate 20 is a square member. In another embodiment, a differently shaped polygon form is implemented. The top plate 20 further includes a plurality of winch bolt receivers 22. One skilled in the art would understand the applicant's design is not the exclusive embodiment.

As illustrated, the support plate 30 is an elongated member positioned perpendicular to the top plate 20. The support plate 30 further includes a plurality of support plate clamp receivers 32.

As illustrated, the coupling plate 40 is a double hinge shaped member that includes a first portion 42. The first portion 42 of the coupling plate 40 is positioned perpendicular to the top plate 20. The first portion 42 of the coupling plate 40 further includes a security plate 44. The security plate 44 is elongated and parallel to the top plate 20 and perpendicular to the first portion 42. The first portion 42 further includes a pair of coupling plate clamp receivers 46 corresponding to the support plate clamp receivers 32 of the support plate 30.

The coupling plate 40 further includes a second portion 48, wherein the first portion 42 of the coupling plate 40 has a greater surface area than the second portion 48 of the coupling plate 40. The second portion 48 of the coupling plate 40 is an elongated member positioned perpendicular to the top plate 20. The second portion 48 of the coupling plate 40 further includes a pair of securing receivers 50.

As illustrated, the support gussets 52 are triangular members. One skilled in the art would understand the applicant's design is not the exclusive embodiment.

In the exemplary embodiment, the lower mount assembly 60 generally includes a lower coupling plate 70.

As illustrated, the lower coupling plate 70 includes a first portion 72 and a second portion 74. The first portion 72 of the lower coupling plate 70 is a J-shaped member. The first portion 72 includes a pair of clamp receivers 76 corresponding to the support plate clamp receivers 32 of the support plate 30.

The second portion 74 of the lower coupling plate 70 is an elongated member. The second portion 74 further includes a pair of securing receivers 78 corresponding to the securing receivers 50 of the second portion 48 of the coupling plate 40.

The lower coupling plate 70 further includes a cradle 80. The cradle 80 is on the first portion 72 of the lower coupling plate 70 and adjacent the second portion 74 of the lower coupling plate 70.

In the exemplary embodiment, the winch assembly 4 includes a winch 90. The winch 90 is a standard winch 90 composed of similar parts wherein one skilled in the art would understand the workings of the winch 90.

As assembled, the support plate 30 is positioned and fixed to a bottom portion of the top plate 20. The first portion 42 of the coupling plate 40 is positioned and fixed to the bottom portion of the top plate 20. The support plate 30 and the coupling plate 40 are positioned parallel. The lower coupling plate 70 is positioned on an inner face of the support plate 30.

As illustrated, each gusset 52 is positioned on the bottom portion of the top plate 20. One gusset 52 is positioned in part on a central portion of the support plate 30. The second gusset 52 is positioned in part on the first portion 42 of the coupling plate 40.

In the exemplary embodiment, the upper mount assembly 10 is a single weldment. However, one skilled in the art would understand a multi-weldment for the upper mount assembly 10 can be implemented.

As illustrated, the winch assembly 4 is positioned and fastened to a top portion of the top plate 20 by the plurality of winch bolt receivers 22.

An operator chooses a crossmember B of a standard lift. The lower coupling plate 70 is positioned on a bottom portion of the crossmember B. The crossmember B is positioned within a crossmember receiver 100. The crossmember receiver 100 is formed by the first portion 42 of the coupling plate 40, the security plate 44, the first portion 72 of the lower coupling plate 70 and the cradle 80 wherein the crossmember B becomes flush. Additionally, a fastener E is threaded through the lower coupling plate 70 and through the crossmember B. The support plate 30 is positioned on the outer portion of the first portion 72 of the lower coupling plate 70.

A pair of upper fasteners UF are threaded through the support plate clamp receivers 32 and coupling plate clamp receivers 46 and the pair of clamp receivers 76 of the lower mount assembly 60.

A pair of lower fasteners LF are threaded through the securing receivers 50 of the upper mount assembly 10 and the securing receivers 78 of the lower mount assembly 60. The crossmember B is therefore clamped in placed.

As illustrated, the upper mount assembly 10 and the lower mount assembly 60 include a height adjustment feature. An operator lowers the first portion 72 of the lower coupling plate 70 in a first direction to couple to a second pair of the support plate clamp receivers 32 of the support plate 30 to accommodate a larger crossmember B. Additionally, the second portion 74 of the lower coupling plate 70 is lowered in the first direction to couple with a second pair of securing receivers 50 of the second portion 48 of the coupling plate 40.

In another embodiment, the operator raises the first portion 72 of the lower coupling plate 70 in a second direction to couple the first pair of the support plate clamp receivers 32 to the support plate 30 to accommodate a smaller dimensionally sized crossmember B. Additionally, the second portion 74 of the lowering coupling plate 70 is raised in the second direction to couple with the first pair of securing receivers 50 of the second portion 48 of the coupling plate 40.

As illustrated, the upper mount assembly 10 and the lower mount assembly 60 include a width adjustment feature. The operator loosens or tightens the upper fastener UF that is inserted into the support plate clamp receivers 32, the pair of clamp receivers 76 and the coupling plate clamp receivers 46.

Additionally, the operator loosens or tightens the lower fastener LF that is inserted into the pair of securing receivers 50 of the second portion 48 of the coupling plate 40 and the pair of securing receivers 78 of the second portion 74 of the lower coupling plate 70.

It should be noted that various changes and modifications to the embodiments described herein will be apparent to those skilled in the art. Such changes and modifications may be made without departing from the spirit and scope of the present invention and without diminishing its intended advantages. For example, various embodiments of the systems and methods may be provided based on various combinations of the features and functions from the subject matter provided herein.

What is claimed is:

1. A winch mount assembly comprising:
a mount assembly having:
an upper mount assembly having:
a top plate;
a support plate positioned perpendicular to the top plate;
a security plate positioned perpendicular to the top plate;
a coupling plate having:
a first portion positioned perpendicular to the top plate; and
a second portion, the first portion of the coupling plate has a greater surface area than the second portion of the coupling plate; and
a lower mount assembly having:
a lower coupling plate having:
a first portion having:
a pair of clamp receivers corresponding to the support plate;
a second portion having:
a pair of securing receivers corresponding to the second portion of the coupling plate, a crossmember receiver formed by the first portion of the coupling plate, the security plate, the first portion of the lower coupling plate; and
a winch coupled to the top plate.

2. The winch mount assembly of claim 1, the top plate further includes a plurality of winch bolt receivers.

3. The winch mount assembly of claim 2, wherein the support plate further includes a plurality of support plate clamp receivers.

4. The winch mount assembly of claim 3, wherein the first portion of the coupling plate further includes a pair of coupling plate clamp receivers corresponding to a pair of support plate clamp receivers of the plurality of support plate clamp receivers.

5. The winch mount assembly of claim 4, wherein the second portion of the coupling plate further includes a pair of securing receivers.

6. The winch mount assembly of claim 5, wherein the first portion of the lower coupling plate includes a pair of clamp receivers corresponding to the pair of support plate clamp receivers.

7. The winch mount assembly of claim 6, wherein the second portion of the lower coupling plate further includes a pair of securing receivers corresponding to the pair of securing receivers of the coupling plate.

8. The winch mount assembly of claim 7, wherein the lower coupling plate further includes a cradle positioned on the first portion of the lower coupling plate and adjacent the second portion of the lower coupling plate.

9. The winch mount assembly of claim 8, wherein the support plate is positioned and fixed to a bottom portion of the top plate.

10. The winch mount assembly of claim 9, wherein the first portion of the coupling plate is positioned and fixed to the bottom portion of the top plate.

11. The winch mount assembly of claim 10, wherein the support plate and the lower coupling plate are positioned parallel in which the coupling plate is positioned on an inner face of the support plate.

12. The winch mount assembly of claim 11, wherein the upper mount assembly further comprises a pair of gussets.

13. The winch mount assembly of claim 12, wherein a first gusset is positioned on a central portion of the support plate.

14. The winch mount assembly of claim 13, wherein a second gusset is positioned on the first portion of the coupling plate.

15. The winch mount assembly of claim 14, wherein the winch is positioned and fastened to a top portion of the top plate by the plurality of winch bolt receivers.

16. The winch mount assembly of claim 15, wherein the lower coupling plate is positioned on a bottom portion of a crossmember.

17. The winch mount assembly of claim 16, wherein a fastener is threaded through the lower coupling plate and through the crossmember.

18. The winch mount assembly of claim 17, wherein an upper fastener upper fastener is inserted into the pair of support plate clamp receivers, the pair of clamp receivers of the lower coupling plate and the pair of coupling plate clamp receivers of the coupling plate.

19. The winch mount assembly of claim 18, wherein a lower fastener is inserted into the pair of securing receivers of the second portion of the coupling plate and the pair of securing receivers of the second portion of the lower coupling plate.

20. The winch mount assembly of claim 19, wherein the crossmember is flush.

* * * * *